June 1, 1965     H. D. SISK ETAL     3,187,245

POLYPHASE MOTOR WITH PLURAL WINDING SECTIONS

Filed July 20, 1961     2 Sheets-Sheet 1

INVENTORS:
ROBERT F. MUNIER
HOLLIS D. SISK

BY Gravely, Lieder & Woodruff
ATTORNEYS.

INVENTORS:
ROBERT F. MUNIER
HOLLIS D. SISK
BY Gravely, Lieder & Woodruff
ATTORNEYS.

United States Patent Office 3,187,245
Patented June 1, 1965

3,187,245
POLYPHASE MOTOR WITH PLURAL WINDING
SECTIONS
Hollis D. Sisk, St. John, Mo., and Robert F. Munier,
O'Fallon, Ill., assignors to Wagner Electric Corporation, St. Louis, Mo., a corporation of Delaware
Filed July 20, 1961, Ser. No. 125,423
8 Claims. (Cl. 318—225)

This invention relates to polyphase motors and more particularly to an improved winding arrangement for starting polyphase motors.

A well-known arrangement for starting a polyphase motor, such as an induction motor, to avoid excessive starting currents, is to first energize only part of the primary winding of the motor during the starting period and then energize another part or all of the primary winding. This manner of starting a motor has become known as part-winding or increment starting. Various part-winding arrangements have been used; however, the primary winding was usually divided such that substantial portions of the primary or stator core member did not contain energized winding coils during the starting period or the effective flux produced by the starting part of the winding was not distributed symmetrically around the core member. This causes a side pull on the rotor during the starting period because of unbalanced magnetic forces acting on the rotor, and results in an increase in noise and bearing wear. In some cases, these unbalanced forces on the rotor may pull the rotor out of center or even result in contact between the rotor and stator unless the mechanical parts of the motor are made large enough to withstand the strain.

It is therefore an object of the present invention to provide an improved part-winding starting arrangement for a polyphase motor wherein the abovementioned undesirable effects are reduced or eliminated.

Another object of the present invention is to provide an improved part-winding starting arrangement for a polyphase motor wherein sidepull on the rotor member of the motor during the starting period is greatly reduced or eliminated.

Another object is to provide a polyphase induction motor having a polyphase winding in which one section of the winding is energized at starting with the pole groups of coils of this section disposed in the primary core member such that a substantially symmetrical distribution of fluxes is produced.

Another object is to provide a three-phase induction motor having an economical three-phase winding arrangement and wherein improved part-winding starting characteristics are obtained.

Still another object is to provide improved means and method of starting a polyphase motor in a manner to reduce or substantially avoid side pull of the rotor during the starting period.

In accordance with one aspect of the present invention a polyphase motor is provided with a part-winding starting arrangement in which the motor starting portion of the winding includes pole groups of coils distributed such that effective flux is produced entirely around the primary core member during the starting period.

These and other objects and advantages of the present invention will be apparent from the following detailed description and accompanying drawings wherein preferred embodiments of the present invention are shown:

Figure 1:
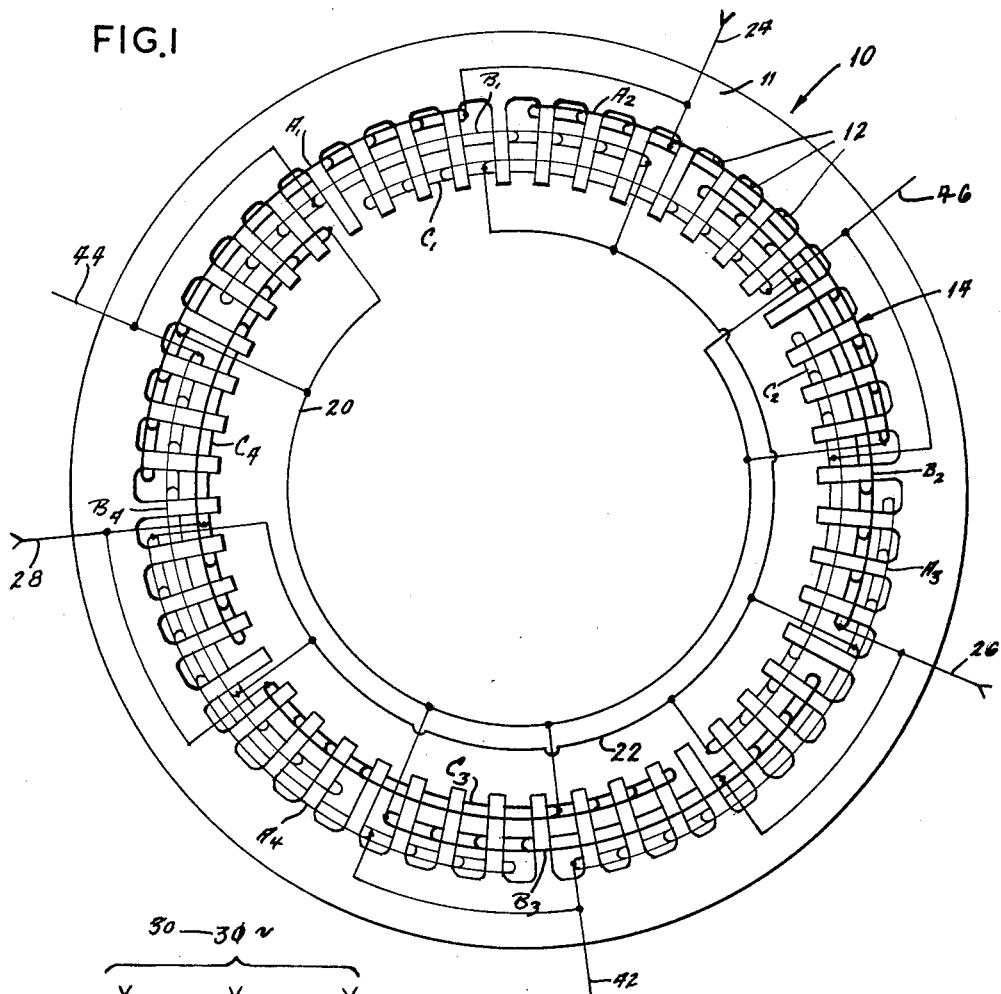
FIG. 1 is a schematic view of the stator of a four-pole polyphase induction motor having a winding arrangement in accordance with one embodiment of the present invention.

Referring now to FIG. 1, there is shown a stator 10 including a core member 11 having a total of forty-eight slots 12 and a winding 14 having three phase windings A, B, and C. Each of the phase windings are arranged to provide four poles. As shown, phase winding A includes four similar phase pole groups of coils $A_1$, $A_2$, $A_3$, and $A_4$; phase winding B includes four similar phase pole groups of coils $B_1$, $B_2$, $B_3$, and $B_4$; and phase winding C includes four similar phase pole groups of concentric coils $C_1$, $C_2$, $C_3$, and $C_4$.

Each of the phase poles are shown having four coils so that the total number of coils equals the total number of slots in the stator. Each phase pole group may have its winding turns distributed so that the four coils each have a different number turns therein or the coils may be formed so that they each have the same number of turns. Each slot of the core will contain two coil sides from different phases, the number of turns in the two coils can be designed to economically substantially fill each slot. An economical concentric coil winding arrangement is shown in the drawing. Concentric coils are generally more easily inserted in the slots of the stator than are other winding arrangements such as the well-known lap type winding arrangement. The phase poles of the winding are of course suitably arranged for three phase operation, the phase windings being spaced 60 electrical degrees apart.

Figure 2:
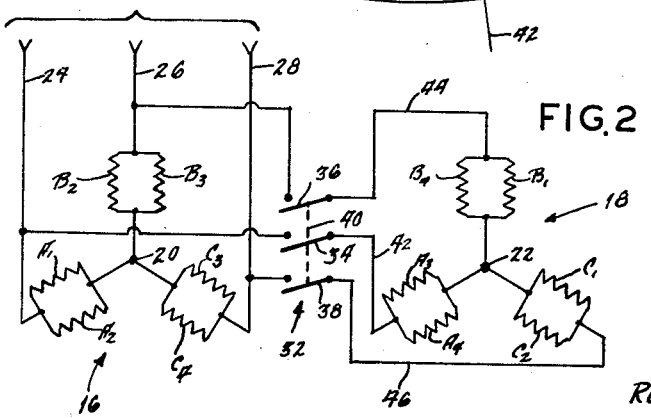
FIG. 2 is a schematic circuit diagram illustrating the windings shown in FIG. 1 arranged in the starting connection.

The winding 14 is connected to form two separate similar three-phase winding sections 16 and 18, as also indicated in FIG. 2. The phase pole groups of coils or phase poles of the winding section 16 are shown in heavy lines and those of section 18 in light lines. Section 16 includes a pair of adjacent phase poles $A_1$ and $A_2$ in parallel with each other, adjacent phase poles $B_2$ and $B_3$ in parallel, and adjacent phase poles $C_3$ and $C_4$ in parallel. The section 18 includes adjacent phase poles $A_3$ and $A_4$ in parallel, adjacent phase poles $B_4$ and $B_1$, in parallel, and adjacent phase poles $C_1$ and $C_2$ in parallel. While the phase poles of each phase in each of the two sections 16 and 18 are shown in parallel circuit relation with each other, they may of course be connected in series with each other as desired or required. The phase poles of section 16 each have one end connected together at a common terminal 20, and the poles of section 18 each have one end connected together at a common terminal 22. The other ends of the phase A, B, and C poles of winding section 16, which section is indicated in FIG. 2 as the motor starting section, are connected by leads 24, 26, and 28, respectively, to a three-phase supply source indicated at 30. The section 18 is connected, after the motor has come up to the desired speed, through a three pole switch 32 to the supply leads 24, 26, and 28. The switch 32 includes three sets of switch contacts 34, 36, and 38 which are operated simultaneously, as indicated by the dashed line connection 40, after a time interval or after the motor has reached a desired predetermined speed. As shown, the other ends of the phase A, B, C poles of section 18 are respectively connected by leads 42, 44, and 46 through the switch contacts 34, 36, and 38, to the supply leads 24, 26, and 28. Thus, closing of the three-pole switch 32 places the two winding sections 16 and 18 in parallel with each other across the supply source 30.

Since the impedance of one winding section alone is higher than the impedance of the two sections connected in parallel with each other, excessive starting currents are avoided by first energizing the starting section 16 and then, after a time, connecting section 18 across the section 16 and supply source 30, as described above.

It will be observed from FIG. 1 that the phase poles of the starting section 16 are distributed such that they extend around the stator core 11 for more than 360 mechanical degrees. It will be seen that the arc of the core which is spanned by the coils from each phase is also partially spanned by coils of the other two phases, that is, the coils from one phase overlap coils from the other two phases. For example, in section 16, the twenty-two or twenty-three teeth spanned by coils in phase A include seven teeth which are also spanned by coils in phase B and another seven teeth which are spanned by coils in phase C. In this way, the phase poles of the motor starting section are distributed so that they extend for more than 360 mechanical degrees and produce effective flux throughout the core during the starting period of the motor. Also, it will be noted that every slot 12 contains conductors or coil sides which are carrying current during the starting period.

In a polyphase motor having P poles and a starting winding section including phase poles from the different phases disposed 60P electrical degrees apart, it has been found that the average magnetic forces acting on the rotating member are balanced during the starting period of the motor. Such motors include those having P poles where P is in accordance with the progression 2, 4, 8, 10, 14, 16, 20, 22 ... $n$. In certain other motors having 6N poles where N is an integer, or where the number of pole groups of coils do not contain phase pole centers from different phases disposed 60P electrical degrees apart, a reduction in side pull effect can be obtained by disposing the phase pole centers of the phases at least 45P electrical degrees apart, or within the range between 45P and 75P electrical degrees.

It will be apparent from FIG. 1, in regard to the motor starting section 16, that the phase poles from the three phases are disposed 60P electrical degrees apart. For example phase pole $B_2$ is disposed 60P electrical degrees from phase pole $A_1$, and phase pole $C_3$ is disposed 60P electrical degrees from phase pole $B_2$ or 120P electrical degrees (in the same direction) from phase pole $A_1$. Since FIG. 1 represents the stator of a 4-pole motor, the abovementioned phase poles $A_1$, $B_2$, and $C_3$ are 60 times 4 or 240 electrical degrees, or 120 mechanical degrees apart. Distribution of the phase poles in the three phases of section 18 is of course similar to that of section 16.

Thus, the three-phase, 4-pole winding shown in FIGS. 1 and 2 is divided into two similar three-phase winding sections 16 and 18 with each section including two adjacent or successive phase poles from each phase, the adjacent phase poles being disposed 120 mechanical or 240 electrical degrees apart.

With this arrangement, the flux distribution is symmetrical around the primary core member 11 during the starting period of the motor so that side-pull effects on the rotor member are avoided. As will be apparent to those familiar in art to which the present invention refers, at any three equidistant points on the stator 10, the average magnetic forces acting on the rotating member of the motor as a result of current flowing in the starting winding section 16 during the starting period, will be equalized. With balanced magnetic forces acting on the rotating member side-pull effects are substantially avoided, and this results in reduced noise and bearing wear.

Figure 3:
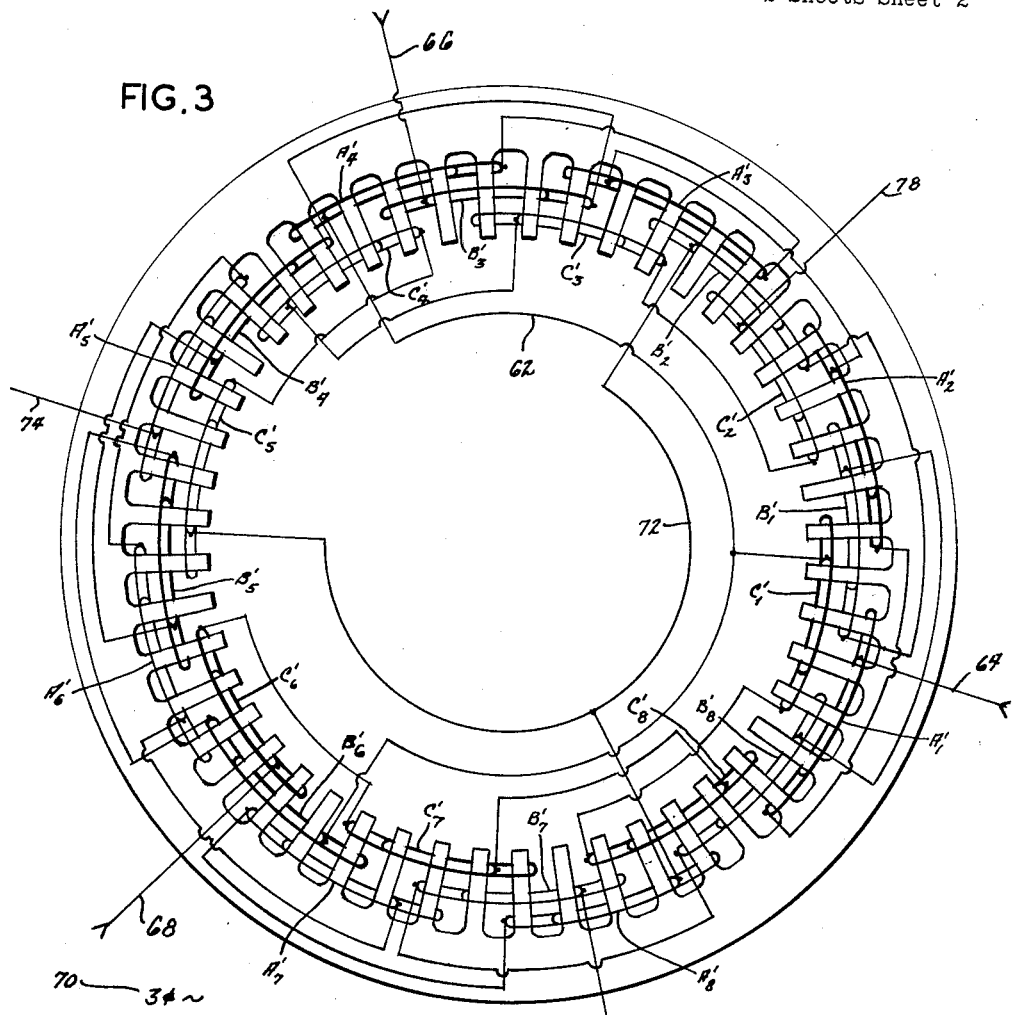
FIG. 3 is a schematic view of the stator of an eight-pole polyphase induction motor having a winding arrangement in accordance with the present invention.
Figure 4:
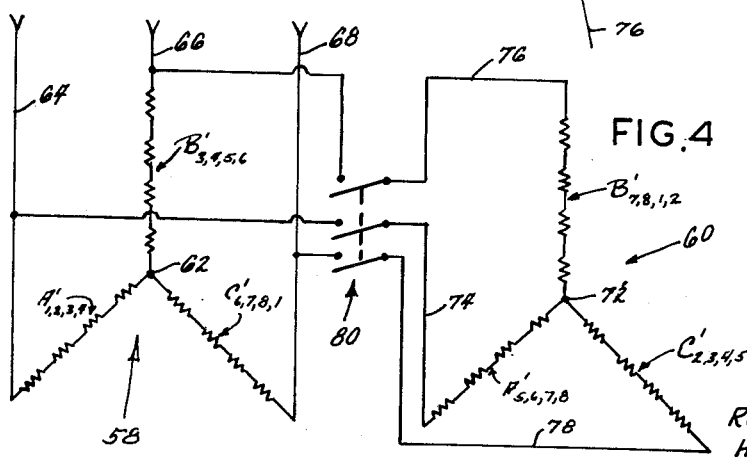
FIG. 4 is a schematic circuit diagram illustrating the windings shown in FIG. 3 arranged in the starting connection.

Referring now to FIGS. 3 and 4, there is shown a stator 50 of an eight-pole induction motor. The stator 50 includes a core member 52 having a total of 48 slots 54 in which are disposed the coils of a primary or stator winding 56. The winding 56 includes three phase windings A', B', and C' each arranged to provide eight poles, the phase pole groups of coils of each of the phase windings being indicated by their respective phase winding designation with numerical subscripts 1 to 8 added thereto.

In the embodiment shown in FIG. 3, each phase pole has two concentric coils so that the winding 56 contains a total of 48 coils. Each slot contains two coil sides from different phases, each coil side containing the same number turns or a different number of turns depending upon the particular design desired.

The winding 56 is connected to form two separate three-phase winding sections 58 and 60, the phase poles of section 58, which will be considered as the motor starting section, are shown in heavy lines while those of section 60 are shown in light lines.

As seen in FIG. 4, motor starting winding section 58 includes successive phase poles $A'_1$, $A'_2$, $A'_3$, and $A'_4$ connected in series with each other between a neutral or common terminal 62, and a supply lead 64, successive phase poles $B'_3$, $B'_4$, $B'_5$, and $B'_6$ connected in series between the neutral terminal 62 and another supply lead 66; and successive phase poles $C'_6$, $C'_7$, $C'_8$, and $C'_1$ connected in series between the neutral terminal 62 and the third supply lead 68. The three supply leads are connected to a three-phase supply source 70.

The phase pole groups of coils of the winding section 60 are arranged and connected in the same manner as those of section 58. Successive phase poles $A'_5$, $A'_6$, $A'_7$, and $A'_8$ are shown connected in series between a neutral terminal 72 and a lead 74; the successive phase poles $B'_7$, $B'_8$, $B'_1$, and $B'_2$ are shown connected in series between neutral terminal 72 and a lead 76; and the successive phase poles $C'_2$, $C'_3$, $C'_4$, and $C'_5$ are shown connected in series between neutral terminal 72 and a lead 78. The leads 74, 76, and 78 are connected through a three-pole switch 80 which when closed places winding section 60 in parallel with section 58 across the supply source 70.

As in the construction shown in FIG. 1, the coils in each of the three phases of the motor starting section 58 in FIG. 3 are overlapped by coils in each of the other phases and the phase poles of the motor starting section 58 extend around the stator core member for more than 360 mechanical degrees so that effective flux is produced throughout the core member during the starting period of the motor. With regard to winding section 58, the centers of the phase poles of phase B' are displaced 60P or 480 electrical degrees from the phase poles of phase A', and the phase poles of phase C' are 60P or 480 electrical degrees from the phase poles of phase B', as is apparent in FIG. 3. Again, it will be apparent that fluxes in the core 52 during the starting period will be symmetrically distributed so that the average magnetic forces acting on the rotating member of the motor at any three equidistant points on the core will be equal. Thus, side-pull effects will be substantially avoided.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. In a three-phase motor having P poles and including a primary core member provided with a plurality of slots, a three-phase winding comprising P phase pole groups of coils per phase disposed in said slots and distributed around said core member for three-phase operation, said winding being divided into two similar sections, each of said sections including a selected group of adjacent phase pole groups from each phase connected together to form a three-phase circuit, said selected groups in the three phases in each of said sections being disposed circumferentially of said core member 60P electrical degrees apart, means for connecting one of said sections to a supply source to energize all of the coils in each of said pole groups in said one section for starting the motor, and means for connecting the other of said sections in parallel with said one section after the motor has started.

2. A three-phase motor comprising a primary core member having a plurality of slots, a three-phase winding including four pole groups of coils per phase disposed in said slots around the core member, a pair of adjacent pole groups from each phase connected together to form a separate three-phase circuit for starting the motor, said pairs of the pole groups in the three phases of said three-phase circuit being spaced apart 240 electrical degrees, means for energizing said three-phase circuit to effect energization of all of the coils of said pole groups of coils in said three-phase circuit for starting the motor, and means for energizing the rest of the pole groups of coils of said three-phase winding after said three-phase circuit is energized.

3. A three-phase motor having P poles and comprising a core member having a plurality of slots, a three phase winding including phase pole groups of coils for each phase distributed around said core member in said slots for three-phase operation, the total number of coils of said three-phase winding being equal to the total number of slots in said core member, means connecting said plurality of pole groups of coils into two similar three-phase winding sections, each of said sections including at least two successive pole groups from each phase with the pole groups in the three phases in each of said sections symmetrically spaced apart 60P electrical degrees and distributed so that each slot of said core member contains a coil side from each of said sections, means for energizing one of said sections to effect energization of all of the coils of each of said pole groups in said one section for starting the motor, said means for energizing the other of said sections after said one section is energized.

4. In a polyphase motor having P poles including a magnetic core member with a plurality of coil slots, a polyphase winding including P phase pole groups of coils for each phase successively disposed in said coil slots around said core member, said polyphase winding being connected to form separate winding sections with each of said sections including a selected group of at least two successive ones of said phase pole groups of coils from each phase connected together to form a polyphase circuit, said selected groups from the different phases in each of said sections being symetrically equally spaced apart circumferentially of said core within the range of 45P to 75P electrical degrees, means for connecting one of said sections to a source of polyphase current to energize all of the coils of each phase pole group in said one section for starting the motor, and means for connecting the other of said sections in parallel with said one section after said one section is energized.

5. In a three-phase motor having P poles, a primary core member having a plurality of coil slots, a three-phase winding including three phase windings one for each phase disposed in said coil slots for three-phase operation, each of said phase windings including P pole groups of coils disposed successively in said coil slots circumferentially around said core, means connecting said three-phase winding into two similar three-phase winding sections with each of said sections including a selected group of two successive pole groups from each of said phase windings, said selected groups of said three phase windings in each of said sections being symmetrically circumferentially spaced apart within the range of 45P to 75P electrical degrees, means for connecting one of said sections to a source of three phase current to energize all of the coils of each of said pole groups in said one section for starting the motor, and means for connecting the other of said sections in parallel with said one section after the motor has started.

6. In a three phase motor having P poles, a primary core member having a plurality of coil slots, a three phase winding including three phase windings one for each phase disposed in said coil slots for three phase operation, each of said phase windings including P pole groups of coils with the pole groups in each of said three phase windings disposed successively in said coil slots circumferentially around said core, means connecting said three phase winding into two three phase winding sections with each of said sections including ½P pole groups from each of said phase windings, said ½P pole groups of each of said phase windings being successive ones of said pole groups, said ½P pole groups of said three phase windings in each of said sections being symmetrically circumferentially spaced apart 60P electrical degrees, means for connecting one of said sections to a source of three-phase current to energize all of the coils of each of said pole groups in said one section for starting the motor, and means for connecting the other of said sections in parallel with said one section after said one section has been energized.

7. A three phase four-pole induction motor comprising a primary core member having a plurality of slots, a three-phase winding including three phase windings, one for each phase, each of said three phase windings including four phase pole groups of coils successively disposed in said coil slots around said core member to provide four poles for each phase of the motor, means connecting said three-phase winding into two separate three phase winding sections, each of said sections including a pair of successive ones of said phase pole groups of coils from each of said three phase windings to form first and second adjacent phase poles, respectively, for each of the three phases of the motor, said pairs of phase pole groups of coils in each of said sections being spaced relative to each other such that the pole centers of the first and second phase poles of a first of said three phases are spaced substantially 240 electrical degrees, in a given circumferential direction around said core, from the corresponding pole centers of the first and second phase poles of a second of said three phases, respectively, and substantially 480 electrical degrees in said given direction from the corresponding pole centers of the first and second phase poles of the third of said three phases, respectively, means for connecting one of said sections to a source of three phase current to energize all of the coils of each of said pole groups of coils in said one section for starting the motor, and means for connecting the other of said sections in parallel with said one section after said one section has been energized.

8. In a three-phase motor having P poles, a primary core member having a plurality of coil slots, a three phase winding including three phase windings one for each phase disposed in said coil slots for three-phase operation, each of said phase windings including P pole groups of coils disposed successively in said coil slots circumferentially around said core, means connecting said three phase winding into two similar three phase winding sections with each of said sections including at least one pole group of coils from each of said phase windings, said pole groups of coils of said three phase windings in each of said sections being symmetrically circumferentially spaced apart approximately 60P electrical degrees, other means for connecting one of said sections to a source of three-phase current to energize all of the coils of each of said pole groups in said one section for starting the motor, and switching means for connecting the other of said sections in parallel with said one section after the motor has started.

References Cited by the Examiner

UNITED STATES PATENTS

| | | | |
|---|---|---|---|
| 1,899,859 | 2/33 | Early | 318—226 |
| 1,901,586 | 5/33 | Early | 318—226 |
| 2,023,326 | 12/35 | Kilbourne | 318—226 |

ORIS L. RADER, *Primary Examiner.*

JOHN F. COUCH, *Examiner.*